L. D. MALONE AND H. E. HUBBS.
CHAIN BOLT.
APPLICATION FILED MAR. 13, 1919.
1,306,386.
Patented June 10, 1919.
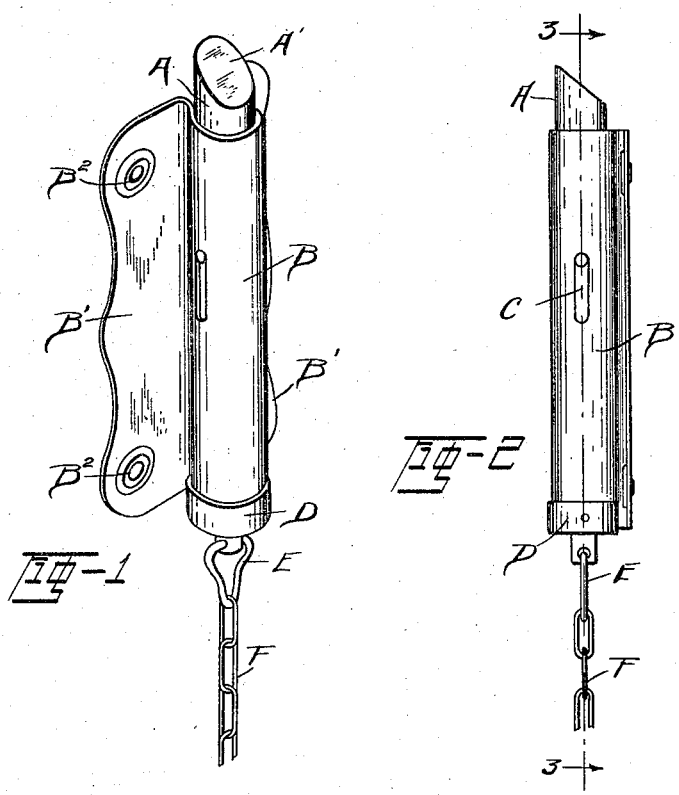
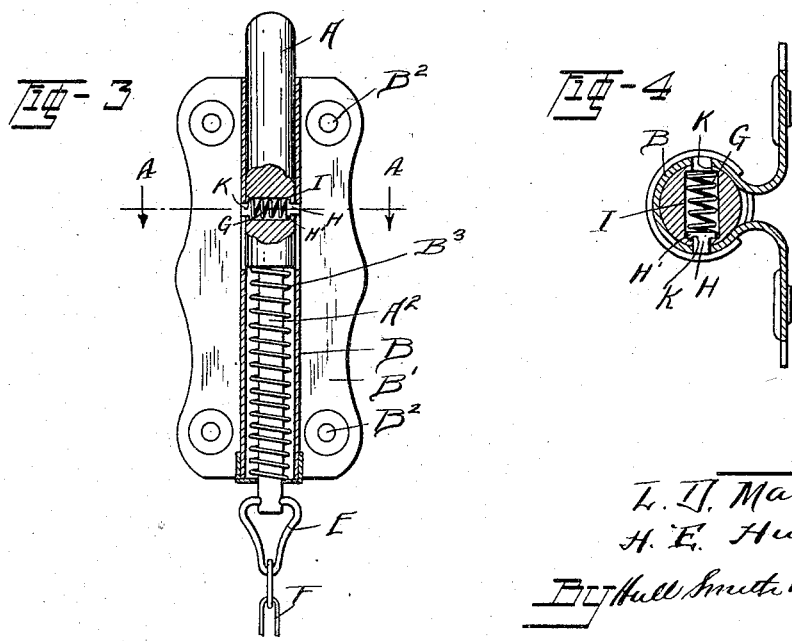

UNITED STATES PATENT OFFICE.

LEVI D. MALONE AND HENRY E. HUBBS, OF SHELBY, OHIO, ASSIGNORS TO THE SHELBY SPRING HINGE COMPANY, OF SHELBY, OHIO, A CORPORATION OF OHIO.

CHAIN-BOLT.

1,306,386.　　　　Specification of Letters Patent.　　Patented June 10, 1919.

Application filed March 13, 1919. Serial No. 282,308.

*To all whom it may concern:*

Be it known that we, LEVI D. MALONE and HENRY E. HUBBS, citizens of the United States, residing at Shelby, in the county of Richland and State of Ohio, have invented a certain new and useful Improvement in Chain-Bolts, of which the following is a full, clear, and exact description, reference being had to the accompanying drawings.

This invention relates generally to bolts and more particularly to that class thereof known as chain bolts in which the pull upon said bolt is exerted through the medium of a chain connected thereto, the bolt being returned to its normal or locked position by means of a spring operating thereon.

These spring actuated chain bolts are usually provided with a beveled end or nose, and it is desirable therefore that the bolt should be reversible in order to be operable in either direction, and the object of our invention, therefore, is to provide a spring actuated chain bolt which shall be reversible and which will consist of a minimum number of parts, simple in construction, and quickly and easily assembled.

With these objects in view our invention consists in the novel features of construction herein set forth and described in the appended claims.

In the drawings forming part of the specification Figure 1 is a perspective view of a chain bolt; Fig. 2 is a side elevation of the same; Fig. 3 is a vertical sectional view on the line 3—3 of Fig. 2 and Fig. 4 is a transverse horizontal section on the line 4—4 of Fig. 3.

In carrying out our invention we employ a bolt A having the beveled end or nose A', which is adapted to operate in connection with a keeper (not shown).

The bolt is contained within a casing B comprising a substantially cylindrical body portion having oppositely disposed ears or wings B' which are apertured as shown at $B^2$ to permit the ready attachment of the casing to the object or structure it is intended to secure. This casing is provided with oppositely disposed slots C said slots being elongated in the direction of the longitudinal axis of the bolt and casing. The lower end of the cylindrical body portion of the casing is closed by means of a cap D and the bolt is reduced for the greater portion of its length as shown at $A^2$ and this reduced end is projected through the central opening in the cap and is provided with a ring E to which the pull chain F is attached. The reduced portion of the bolt is circular in cross section and surrounding said reduced portion is a coiled spring $B^3$, one end of said spring bearing against the cap and the opposite end against the shoulder of the bolt.

The upper portion of the bolt has a transverse bore G produced therein, and located in said bore, at one end, is a pin H. The inner end of said pin being slightly larger than the outer end as shown at H', and pressing upon the pin H is a coiled spring I contained within the bore in the bolt, the opposite end of the bore being peened over as shown at K, in order to hold the spring within the transverse bore and against the pin H.

The operation of the bolt is obvious to every one skilled in the art to which it pertains, and it will be understood that whenever it is desired to reverse the bolt it is only necessary to press the spring pin F inwardly a sufficient distance to carry its extreme outer end through the slot in the casing, and then by turning the bolt in the desired direction toward the outer portion of the casing, the pin will be held back until it has reached the longitudinal slot upon the opposite side of the casing, and the spring acting constantly, will force the pin outwardly into engagement with the slotted casing thereby holding the bolt against further movement.

The longitudinal slots being at oppositely disposed points a complete reversal of the bolt will be had in the afore-mentioned manner.

It will thus be seen that we provide an exceedingly cheap, simple, and efficient spring actuated spring bolt capable of quick and easy reversal whenever desired.

Having thus described our invention, what we claim is:—

1. A device of the kind described comprising a casing having oppositely disposed openings, a longitudinally movable bolt capable of turning in said casing, and a transversely movable pin carried by said bolt and adapted to be brought into engagement with the casing.

2. A device of the kind described comprising a casing having oppositely disposed openings, a longitudinally movable spring actuated bolt capable of turning in said casing, and a transversely movable spring actuated pin carried by said bolt and adapted to be brought into engagement with the casing.

3. A device of the kind described comprising a casing consisting of a body portion having integral wings and a cap piece upon one end of the body portion, the sides of the body having oppositely disposed slots, a bolt arranged in the body portion and having a reduced end projecting through said cap, a spring surrounding said reduced portion, and a transversely movable spring actuated pin carried by said bolt.

4. A device of the kind described comprising a casing having a longitudinal slot therein, a spring actuated bolt arranged in said casing, said bolt being capable of turning in said casing and a pin carried by said bolt and adapted to be brought into engagement with the slot in the casing for the purpose specified.

5. A device of the kind described comprising a casing having a slot in the side thereof, a longitudinally movable spring actuated bolt arranged in said casing, said bolt being also capable of rotating within the casing, said bolt having a transverse bore, a pin located in said bore and a spring contained also within the bore and adapted to bear upon said pin and adapted to project the outer end of the pin into engagement with the slot in the casing.

In testimony whereof, we hereunto affix our signatures in the presence of two witnesses.

LEVI D. MALONE.
HENRY E. HUBBS.

Witnesses:
JOSEPHINE TULLIS,
ROY J. SNYDER.